(12) United States Patent
Komori et al.

(10) Patent No.: US 11,584,873 B2
(45) Date of Patent: Feb. 21, 2023

(54) SEALING MEMBER AND VIBRATION DAMPING DEVICE INCLUDING THE SAME

(71) Applicant: HONDA MOTOR CO., LTD., Tokyo (JP)

(72) Inventors: Kentaro Komori, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 404 days.

(21) Appl. No.: 16/763,467

(22) PCT Filed: Oct. 25, 2018

(86) PCT No.: PCT/JP2018/039637
§ 371 (c)(1),
(2) Date: May 12, 2020

(87) PCT Pub. No.: WO2019/097975
PCT Pub. Date: May 23, 2019

(65) Prior Publication Data
US 2020/0291280 A1    Sep. 17, 2020

(30) Foreign Application Priority Data

Nov. 14, 2017 (JP) .............................. JP2017-218810

(51) Int. Cl.
*C09K 3/10* (2006.01)
*C08G 18/76* (2006.01)
(Continued)

(52) U.S. Cl.
CPC ........ *C09K 3/1021* (2013.01); *C08G 18/7671* (2013.01); *C08K 5/11* (2013.01);
(Continued)

(58) Field of Classification Search
CPC .......... C09K 3/1021; C09K 2200/0441; C09K 2200/065; C09K 3/10; C08G 18/7671;
(Continued)

(56) References Cited

U.S. PATENT DOCUMENTS 5,021,534 A    6/1991  Kawasaki et al.
5,866,519 A    2/1999  Watts et al.
(Continued)

FOREIGN PATENT DOCUMENTS

CN    1253159 A    5/2000
CN    1771273 A    5/2006
(Continued)

OTHER PUBLICATIONS

English Translation of CN 105733491 (Year: 2016).*
(Continued)

*Primary Examiner* — Andrew J. Oyer
(74) *Attorney, Agent, or Firm* — Rankin, Hill & Clark LLP

(57) ABSTRACT

A sealing member according to the present invention is a sealing member against a synthetic oil containing an ester-type additive, and includes 95.0% by mass or more and 99.5% by mass or less of a para-phenylene diisocyanate-based polyurethane and 0.5% by mass or more and 5% by mass or less of a same compound as the ester-based additive. The sealing member according to the present invention has a smaller friction coefficient and more excellent deformability than conventional sealing members and that can inhibit swelling caused by a synthetic oil.

2 Claims, 4 Drawing Sheets

(51) Int. Cl.
*C08K 5/11* (2006.01)
*F16F 9/36* (2006.01)
*F16J 15/20* (2006.01)

(52) U.S. Cl.
CPC .............. *F16F 9/36* (2013.01); *F16J 15/20* (2013.01); *C08G 2190/00* (2013.01); *C09K 2200/0441* (2013.01); *C09K 2200/065* (2013.01); *F16F 9/362* (2013.01); *F16F 2224/02* (2013.01); *F16F 2230/30* (2013.01); *F16F 2234/02* (2013.01)

(58) Field of Classification Search
CPC .......... C08G 2190/00; C08G 2350/00; C08G 18/42; C08G 18/48; C08G 18/7614; C08K 5/11; C08K 5/0016; F16F 9/36; F16F 9/362; F16F 2224/02; F16F 2230/30; F16F 2234/02; F16J 15/20; F16J 15/3284; F16J 15/56
See application file for complete search history.

(56) References Cited

U.S. PATENT DOCUMENTS

| | | |
|---|---|---|
| 2006/0194938 A1 | 8/2006 | Watanabe et al. |
| 2009/0166984 A1 | 7/2009 | Matsui et al. |
| 2011/0042004 A1 | 2/2011 | Schubert et al. |
| 2015/0159068 A1 | 6/2015 | Schubert et al. |
| 2016/0153559 A1 | 6/2016 | Duggal et al. |
| 2017/0335231 A1 | 11/2017 | Aoki et al. |
| 2018/0305634 A1 | 10/2018 | Scholz et al. |

FOREIGN PATENT DOCUMENTS

| | | |
|---|---|---|
| CN | 101134888 A | 3/2008 |
| CN | 101321976 A | 12/2008 |
| CN | 101993521 A | 3/2011 |
| CN | 104292412 A | 1/2015 |
| CN | 105733491 A | 7/2016 |
| EP | 1959171 A1 | 8/2008 |
| JP | H01-126318 A | 5/1989 |
| JP | H05-339335 A | 12/1993 |
| JP | H06-116354 A | 4/1994 |
| JP | H07-26137 A | 1/1995 |
| JP | H11-507963 A | 7/1999 |
| JP | 2002-372155 A | 12/2002 |
| JP | 2008-115267 A | 5/2008 |
| JP | 2016-113521 A | 6/2016 |
| JP | 2016-535149 A | 11/2016 |
| WO | 2014141956 A1 | 9/2014 |
| WO | 2016174973 A1 | 11/2016 |
| WO | 2017047718 A1 | 3/2017 |

OTHER PUBLICATIONS

Office Action received in corresponding CN application No. 201880073503.8 dated Sep. 3, 2021 with English translation (12 pages).

Office Action received in corresponding CN application No. Y201880073503.8 dated Mar. 23, 2022 with English translation (12 pages).

International Search Report by ISA/JP dated Dec. 25, 2018, on PCT/JP2018/039637, 2 pages.

Written Opinion by ISA/JP dated Dec. 25, 2018, on PCT/JP2018/039637, 4 pages.

* cited by examiner

SEALING MEMBER AND VIBRATION DAMPING DEVICE INCLUDING THE SAME

TECHNICAL FIELD

The present invention relates to a sealing member and a vibration damping device including the sealing member.

BACKGROUND ART

Conventionally, there have been known sealing members made of polyurethane resin compositions (for example, see Patent Literature 1). Among these, a para-phenylene diisocyanate-based polyurethane (PPDI urethane resin) forms a sealing member excellent in heat resistance, compression set, low temperature identification, and so on.

CITATION LIST

Patent Literature

Patent Literature 1: Japanese Patent Application Publication No. H06-116354

SUMMARY OF INVENTION

Technical Problem

However, the PPDI urethane resin sealing member has less deformability than that of other elastic sealing members in the use for sealing in a sliding portion and has a problem of a large friction coefficient. Additionally, although the PPDI urethane resin sealing member exhibits an outstanding abrasion resistance as a sliding member, there is also a problem that the PPDI urethane resin sealing member cannot provide its excellent low friction characteristics as expected when used in the presence of oil because the constituents of the oil permeate into the sealing member itself and the sealing member gets swollen.

An object of the present invention is to provide a sealing member that has a smaller friction coefficient and more excellent deformability than those of conventional ones and that can inhibit the swelling caused by oil, and also provide a vibration damping device including the sealing member.

Solution to Problem

The present inventors found that an ester-based additive among multiple constituents constituting oil is selectively drawn into a para-phenylene diisocyanate-based polyurethane (PPDI urethane resin), and thus the resin gets swollen. Additionally, the present inventors also found out that blending the ester-based additive with the resin at a predetermined ratio in advance inhibits the swelling of the resin and allows the ester-based additive to decrease the friction coefficient of the resin and even enhance the deformability, and thus the present inventors have reached the present invention.

The present invention that solves the above-described problems is a sealing member against oil containing an ester-based additive, including: 95.0% by mass or more and 99.5% by mass or less of a para-phenylene diisocyanate-based polyurethane; and 0.5% by mass or more and 5% by mass or less of a same compound as the ester-based additive.

Additionally, the present invention is a vibration damping device including the above-described sealing member.

Advantageous Effects of Invention

According to the present invention, it is possible to provide a sealing member that has a smaller friction coefficient and more excellent deformability than conventional sealing members and that can inhibit the swelling caused by oil.

DESCRIPTION OF EMBODIMENTS

Next, a sealing member according to an embodiment of the present invention is described. Although the sealing member of this embodiment can be widely used as an industrial sealing member, hereinafter, a vibration damping device as an example to which the sealing member is applied is described first.

<Overall Configuration of Vibration Damping Device>

Figure 1:
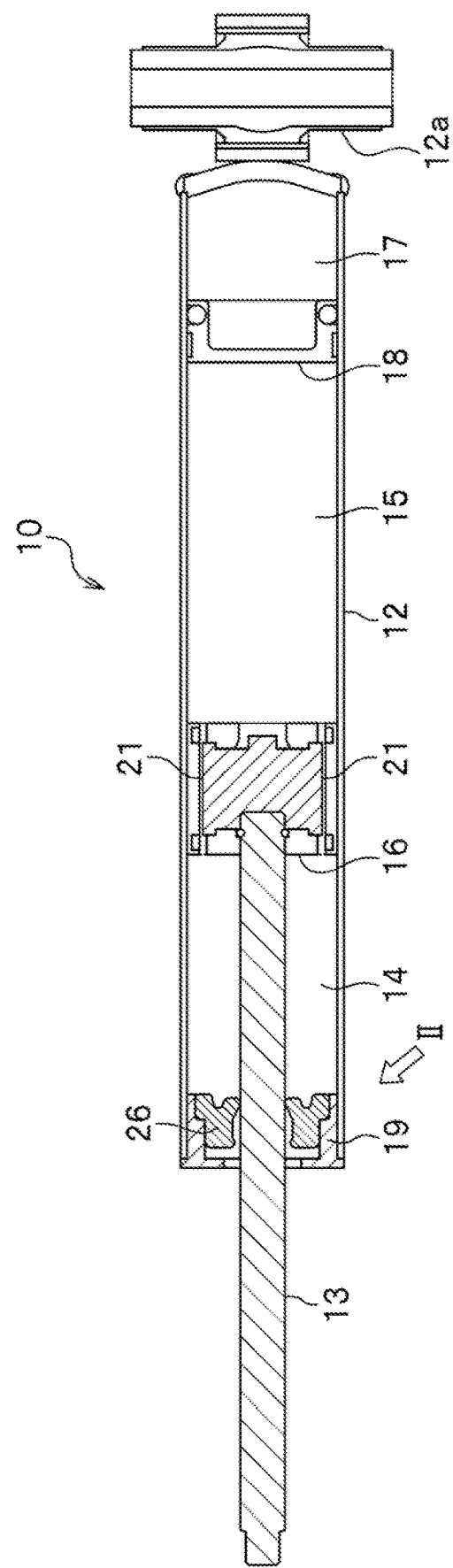
FIG. 1 is a cross-sectional view illustrating a schematic structure of a vibration damping device including a sealing member of the present invention.

FIG. 1 is a cross-sectional view illustrating a schematic structure of a vibration damping device 10 in which a sealing member 26 according to this embodiment is used.

The vibration damping device 10 is a damper of a monotube type (de Carbon type) mounted in a vehicle.

The vibration damping device 10 includes a cylinder 12 and piston 16 and free piston 18 slidably arranged in the cylinder 12.

The piston 16 is formed in a substantially column shape and separates the inside of the cylinder 12 into a first liquid chamber 14 and a second liquid chamber 15. In the piston 16 in this embodiment, a communication hole 21 that allows the first liquid chamber 14 and the second liquid chamber 15 to communicate with each other is formed. These first liquid chamber 14 and second liquid chamber 15 are filled with oil described later.

The free piston 18 is arranged in the cylinder 12 to be aligned in series with the piston 16 in the axial direction. The free piston 18 is formed in a substantially column shape and separates the inside of the cylinder 12 into the above-described second liquid chamber 15 and a high pressure gas chamber 17. The high pressure gas chamber 17 is filled with a gas at high pressure.

In an end portion opening of the cylinder 12 on a side on which the high pressure gas chamber 17 is formed, an eyepiece 12a is arranged so as to close the end portion opening. The eyepiece 12a in this embodiment is assumed to be the one to be coupled to a trailing arm as a wheel side member using a not-illustrated bolt inserted through the eyepiece 12a.

In an end portion opening of the cylinder 12 on a side on which the first liquid chamber 14 is formed, a substantially cylindrical rod guide 19 is inserted and fitted. Additionally, a piston rod 13 is inserted in the inner peripheral side of the rod guide 19, and the rod guide 19 extends in the cylinder 12. A tip end of the piston rod 13 is connected to the piston 16.

A sealing member 26 in a substantially cylindrical shape that prevents the oil in the first liquid chamber 14 from leaking out is arranged between the rod guide 19 and the piston rod 13. These oil and sealing member 26 are described later in detail.

The piston rod 13 extends outside the cylinder 12 through the sealing member 26.

The piston rod 13 in this embodiment is assumed to be the one in which the extending end from the cylinder 12 is to be coupled to a damper base (upper portion of wheelhouse) as a vehicle body side member through a not-illustrated damper mount.

In such a vibration damping device 10, the vibration inputted from the side of a traveling wheel through the eyepiece 12a is damped when the piston 16 and the free piston 18 are reciprocated in the axial direction in the cylinder 12 in the presence of the oil and the high pressure gas.

<Oil>

The oil is formed by adding mainly an ester-based additive to base oil.

The base oil may be, for example, mineral oil, animal oil, plant oil, synthetic oil, or a mixture of these. The synthetic oil is preferable among these.

The synthetic oil may be, for example, hydrocarbon oil such as an olefin that is polymerized, oligomerized, or internally polymerized (for example, polybutylene, polypropylene, propylene isobutylene copolymer); poly (1-hexene), poly (1-octen), a trimer or an oligomer of 1-decene, poly (1-decene) (also called α-olefin), and a mixture of these; alkylbenzene (for example, dodecylbenzene, tetradecylbenzene, sinonylbenzene, di-(2-ethylhexyl)-benzene); polyphenyl (for example, biphenyl, terphenyl, alkylation polyphenyl); diphenylalkane, alkylation diphenylalkane, alkylation diphenylether, and alkylation diphenylsulfide; and a derivative, an analog, and a homolog of these or a mixture of these. Additionally, the synthetic oil may be, for example, a polyolester, a diester, a liquid ester of phosphorous acid (for example, a diethylester such as tricresyl phosphate, trioctyl phosphate, and decanoic phosphonic acid), polymer tetrahydrofuran, a mixture of these, and the like. Note that, the synthetic oil in this embodiment is not limited to these.

The ester-based additive in this embodiment is assumed to be, for example, an antioxidant, an auxiliary anti-abrasion agent, an extreme pressure additive, a friction adjusting agent, and the like to be added to the base oil as described above.

Such an ester-based additive may be, for example, a phthalic acid ester such as dimethyl phthalate, diethyl phthalate, dibutyl phthalate, diisobutyl phthalate, di-n-hexyl phthalate, bis (2-ethylhexyl) phthalate, di-n-octyl phthalate, diisononyl phthalate, dinonyl phthalate, diisodecyl phthalate, diisoundecyl phthalate, and bisbutylbenzyl phthalate; a non-aromatic dibasic ester such as dioctyl adipate, dioctyl sebacate, dibutyl sebacate, and isodecyl succinate; an aliphatic ester such as butyl oleate and methyl acetyl ricinoleate; an ester of polyalkylene glycol such as diethylene glycol dibenzoate, triethylene glycol dibenzoate, and pentaerythritol ester; a phosphoric acid ester such as tricresyl phosphate and tributyl phosphate; and the like. Note that, the ester-based additive in this embodiment is not limited to these.

An amount of the ester-based additive mixed in the oil may be around 0.01% by mass to about 10% by mass, but it is not limited thereto.

<Sealing Member>

The sealing member 26 in this embodiment (see FIG. 1) takes on the substantially cylindrical shape as described above.

Figure 2:
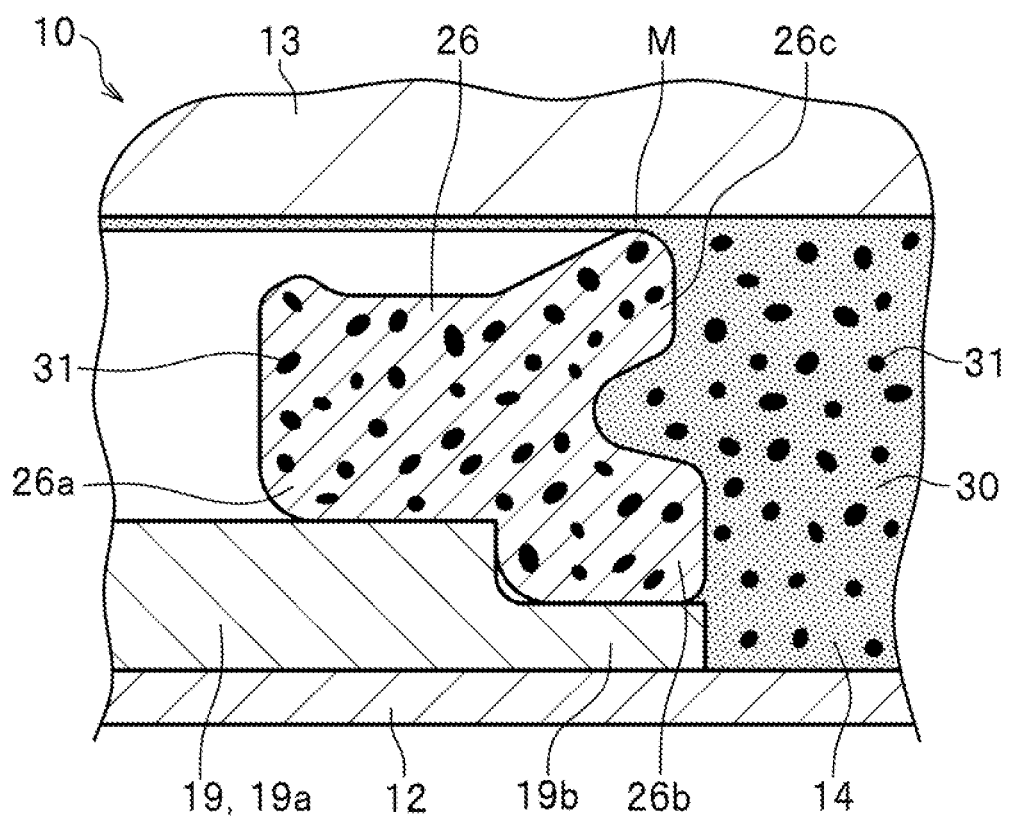
FIG. 2 is a partially enlarged view of an arrow-referenced part II in FIG. 1.

FIG. 2 is a partially enlarged view of an arrow-referenced part II in FIG. 1.

As illustrated in FIG. 2, the sealing member 26 is inserted and fitted in the substantially cylindrical shaped rod guide 19 and is arranged in the cylinder 12 as described above.

In an end portion of the rod guide 19 on the side of the first liquid chamber 14, a step portion 19b is formed to have an inner diameter wider than that of a general inner diameter portion 19a of the rod guide 19.

The sealing member 26 includes a small diameter portion 26a and a large diameter portion 26b having a diameter wider than that of the small diameter portion 26a so as to correspond to the shape of the inner side of the rod guide 19. That is, the sealing member 26 has the small diameter portion 26a inserted and fitted in the general inner diameter portion 19a of the rod guide 19 and the large diameter portion 26b inserted and fitted in the step portion 19b.

Additionally, the sealing member 26 further has a lip portion 26c on the radially inner side of the large diameter portion 26b, the lip portion 26c extending out from an end portion of the small diameter portion 26a on the side of the first liquid chamber 14 to the side of the piston rod 13.

The lip portion 26c in a sectional view along the axis is inclined to be displaced gradually toward the piston rod 13 as the lip portion 26c is closer from the small diameter portion 26a to the first liquid chamber 14. Additionally, an extending end portion of the lip portion 26c is put in contact with a peripheral surface of the piston rod 13.

Note that, although a clearance is formed between the peripheral surface of the piston rod 13 and the extending end portion of the lip portion 26c in FIG. 2, it is a exaggerated expression of a formation of a boundary film M of the oil between the piston rod 13 and the sealing member 26 during the sliding of the piston rod 13 and the sealing member 26 in a relative manner.

Such a sealing member 26 includes 95.0% by mass or more and 99.5% by mass or less of the para-phenylene diisocyanate-based polyurethane and 0.5% by mass or more and 5% by mass or less of a same compound as the above-described ester-based additive 31 in the oil 30.

Note that, although the ester-based additive 31 contained in the sealing member 26 and the oil 30 are illustrated in the form of particles in FIG. 2, this is an image (conceptually) showing the ester-based additive 31 for the sake of convenience for making the drawing, and this is not an expression of the shape, the distribution, and the like of the actual ester-based additive 31.

The para-phenylene diisocyanate-based polyurethane is a reaction product of para-phenylene diisocyanate (1,4-phenylene diisocyanate) and a polyhydroxy compound of polyol and the like and is widely known as PPDI urethane resin.

The polyhydroxy compound can be used by combining a high molecular polyhydroxy compound and a low molecular polyhydroxy compound as a chain extender.

The high molecular polyhydroxy compound may be, for example, polyester polyol, polyether polyol, and the like of around 500 to 5000 of a number average molecular weight Mn, but it is not limited to these.

The low molecular polyhydroxy compound may be, for example, ethanediol, 1,4-butanediol, 1,6-hexanediol, and the like, but it is not limited to these.

The mass ratio of the low molecular polyhydroxy compound with respect to the high molecular polyhydroxy compound can be set arbitrarily within a range of 20/80 to 80/20.

Para-phenylene diisocyanate can be used in an excessive amount with respect to the polyhydroxy compound.

A method of preparing the para-phenylene diisocyanate-based polyurethane in this embodiment may be a one-shot method in which the above-described three constituents are reacted simultaneously or a prepolymer method in which a urethane prepolymer of para-phenylene diisocyanate and the high molecular polyhydroxy compound is prepared in advance.

The para-phenylene diisocyanate-based polyurethane in this embodiment may be obtained by either of the one-shot method and the prepolymer method.

Although para-phenylene diisocyanate and the polyhydroxy compound can be reacted in the presence of a catalyst, it is also possible to advance the reaction without the catalyst.

The above-described catalyst may be, for example, dibutyltin dilaurate, dioctyltin dilaurate, triethylamine, bismuth neodecanoate, 1,8-diazabicyclo [5.4.0] undec-7-ene, and the like, but it is not limited to these.

Note that, the para-phenylene diisocyanate-based polyurethane may have either of a thermoplastic property and a thermosetting property, but the one having a thermosetting property is more preferable. Incidentally, it is also possible to use a para-phenylene diisocyanate-based polyurethane of a marketed product.

The sealing member 26 in this embodiment includes 0.5% by mass or more and 5% by mass or less of the same compound as the above-described ester-based additive 31 (see FIG. 2) in the oil 30 (see FIG. 2) in the para-phenylene diisocyanate-based polyurethane as described above.

The ester-based additive 31 is mixed into the para-phenylene diisocyanate-based polyurethane during the molding of the sealing member 26.

Specifically, a composition containing the above-described materials of the para-phenylene diisocyanate-based polyurethane and the ester-based additive 31 is cured in a predetermined mold, and thereby the sealing member 26 is obtained.

Figure 3:
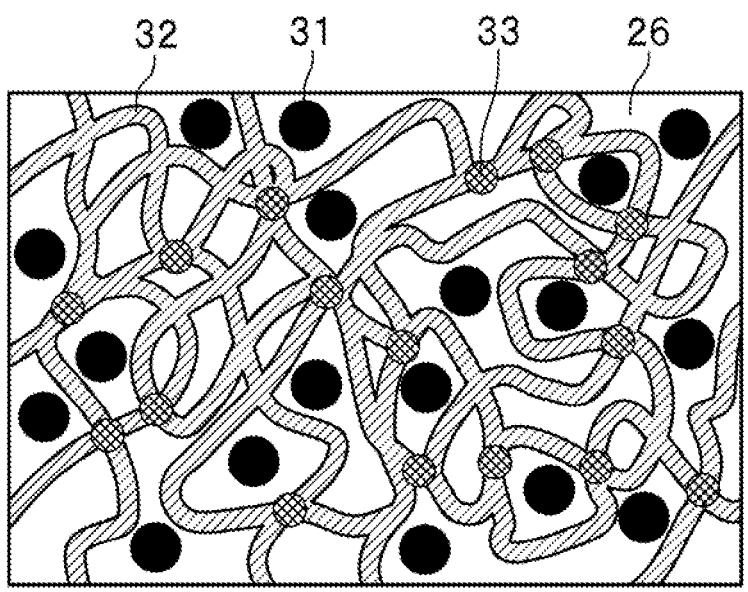
FIG. 3 is a structural concept diagram of the sealing member.

FIG. 3 is a structural concept diagram of the sealing member 26.

As illustrated in FIG. 3, the sealing member 26 of this embodiment is formed so that the para-phenylene diisocyanate-based polyurethane 32 is formed in the form of netting, and the ester-based additive 31 is taken up in the netting. In FIG. 3, a reference sign 33 is a cross-link portion of urethane molecule.

Next, the effects achieved by the sealing member 26 of this embodiment are described.

According to the sealing member 26 (see FIG. 2) of this embodiment as described above, it is possible to provide a sealing member that has a smaller friction coefficient and more excellent deformability than the conventional sealing members and that can inhibit the swelling caused by the oil 30 (see FIG. 2).

Additionally, in the sealing member 26, with the content of the same compound as the above-described ester-based additive 31 (see FIG. 2) contained in the oil 30 being 0.5% by mass or more and 5% by mass or less, the above-described decreasing effect on friction coefficient, inhibiting effect on swelling, and enhancement in deformability become more prominent.

Moreover, in the sealing member 26 (see FIG. 3), with a dioctyl sebacate used as the ester-based additive 31 (see FIG. 3) contained in the para-phenylene diisocyanate-based polyurethane 32 (see FIG. 3), the above-described decreasing effect on friction coefficient, inhibiting effect on swelling, and enhancement in deformability become more prominent.

Furthermore, with the sealing member 26 (see FIG. 3) using the para-phenylene diisocyanate-based polyurethane 32 (see FIG. 3) having the thermosetting property, it is possible to keep more effectively the ester-based additive (see FIG. 3) in the netting of the para-phenylene diisocyanate-based polyurethane 32 (see FIG. 3) during the molding of the sealing member 26.

Additionally, with the sealing member 26 (see FIG. 2) being used for sealing the oil 30 (see FIG. 2) in the vibration damping device 10 (see FIG. 2), it is possible to implement more clearly the above-described decreasing effect on friction coefficient, inhibiting effect on swelling, and enhancing effect on deformability.

Although the embodiment of the present invention is described above, the present invention is not limited to the above-described embodiment, and the present invention can be implemented in various modes.

Although the example in which the sealing member 26 is applied to the vibration damping, device 10 is described in the above-described embodiment, the oil for the vibration damping device 10 may be a magnetic viscosity fluid composition (Magneto-Rheological Fluid (MRF)) containing more magnetic powders. Such a vibration damping device 10 can change the superficial viscosity of the magnetic viscosity fluid composition with a configuration provided with a magnet coil applying a magnetic field to the magnetic viscosity fluid composition flowing through the communication hole 21. According to such a vibration damping device 10, it is possible to adjust the damping force for the vibration in accordance with the degree of the vibration inputted through the wheel.

Moreover, although the sealing member 26 of the vibration damping device 10 for a vehicle is described in the above-described embodiment, the sealing member 26 may be used in vibration damping devices of different fields such as, for example, electric home appliances, facility equipment for civil engineering and construction, and hydraulic load devices in training equipment and health promotion equipment.

EXAMPLE

Hereinafter, examples and comparative examples in which the operations and effects of the present invention were verified are described. Note that, the present invention is not limited to the following examples, and the present invention can be embodied with an arbitrary change without departing from the gist of the present invention.

Example 1

A sealing member in a predetermined shape containing 1% by mass of dioctyl sebacate (DOS) as the ester-based additive in the para-phenylene diisocyanate-based polyurethane was produced.

Next, the sealing member was permeated in synthetic oil (80° C.) containing 10% by mass of dioctyl sebacate (DOS)

as a friction adjusting agent to measure the rate of change in volume every elapsed time. The result is illustrated in FIG. 4.

Figure 4:
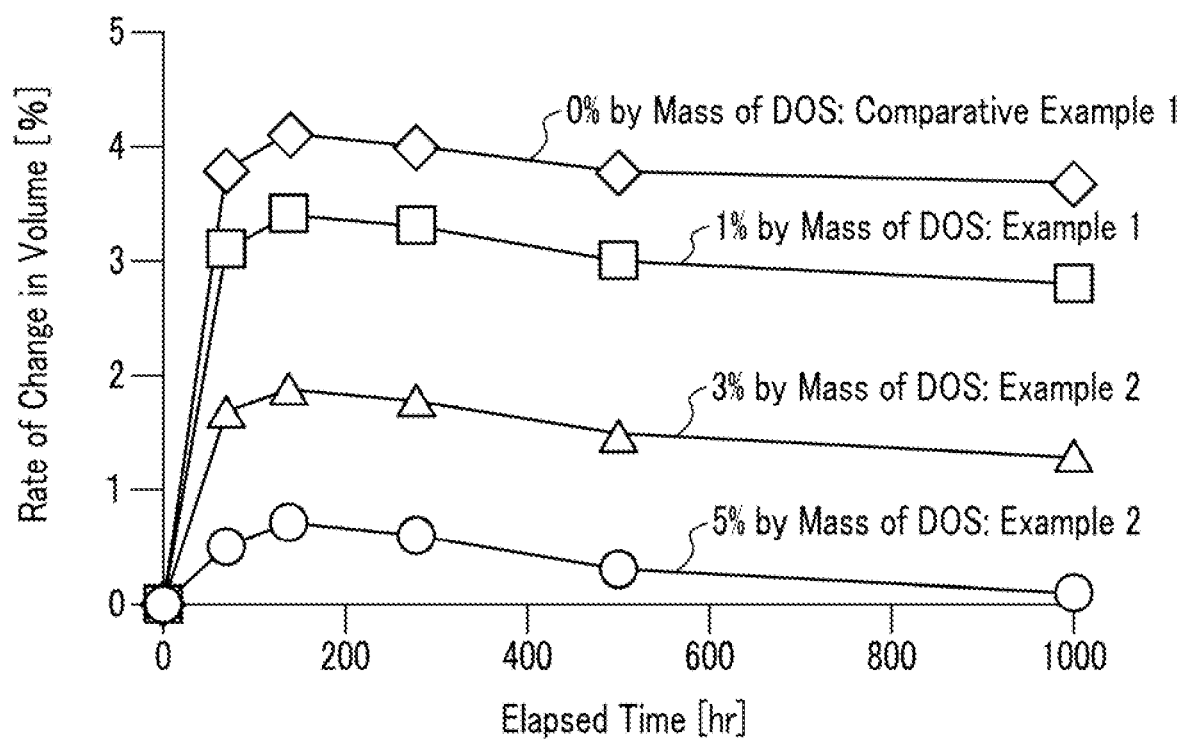
FIG. 4 is a graph showing a relationship between an elapsed time [hr] and a rate of change in volume [%] of the sealing member when the sealing member was permeated in synthetic oil.

FIG. 4 is a graph showing a relationship between an elapsed time [hr] and a rate of change in volume [%] of the sealing member when the sealing member was permeated in the synthetic oil.

Example 2 and Example 3

The sealing member (Example 2) containing 3% by mass of dioctyl sebacate (DOS) and the sealing member (Example 3) containing 5% by mass of dioctyl sebacate (DOS) were produced. Like Example 1, the rate of change in volumes of the respective sealing members were measured. The result is illustrated in FIG. 4.

Comparative Example 1

The sealing member was produced with a para-phenylene diisocyanate-based polyurethane containing no dioctyl sebacate (DOS). Like Example 1, the rate of change in volume of the sealing member was measured. The result is illustrated in FIG. 4.

Comparative Example 2

When it was attempted to produce the sealing member with a para-phenylene diisocyanate-based polyurethane containing 10% by mass of dioctyl sebacate (DOS), the composition was not cured, and it was impossible to mold a sealing member in a predetermined shape.
(Evaluation of Rate of Change in Volume)

As illustrated in FIG. 4, it was confirmed that Example 1 containing 1% by mass of dioctyl sebacate (DOS) inhibited the swelling caused by the oil more than Comparative Example 1 not containing 1% by mass of dioctyl sebacate (DOS) did.

Additionally, Example 2 containing 3% by mass of dioctyl sebacate (DOS) had the maximum rate of change in volume a half or less than that of Comparative Example 1 not containing 3% by mass of dioctyl sebacate (DOS). Moreover, Example 3 containing 5% by mass of dioctylsebacate (DOS) had the maximum rate of change in volume one fourth or less than that of Comparative Example 1 not containing 5% by mass of dioctyl sebacate (DOS).
(Evaluation of Force of Friction)

The three sealing members of Example 1, Example 3 and Comparative Example 1 were produced. Then, the forces of friction of these sealing members were evaluated as below.

Figure 5:
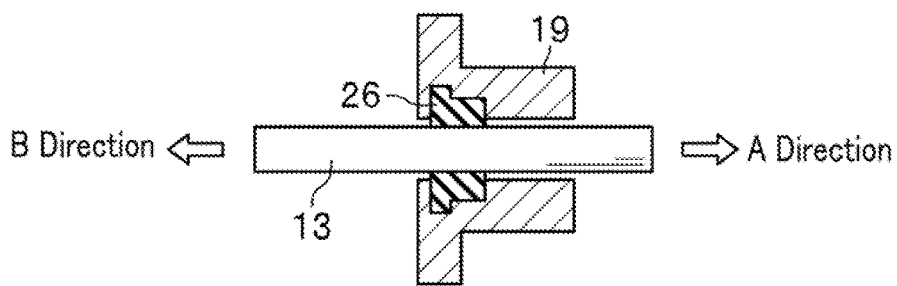
FIG. 5 is a schematic diagram of a device on which an evaluation of a force of friction of the sealing member was performed.

FIG. 5 is a schematic diagram of a device on which an evaluation of the force of friction of the sealing member was performed.

As illustrated in FIG. 5, the device had a configuration in which the piston rod 13 was inserted and slid in the inner peripheral side of the rod guide 19 through the sealing member 26. The oil used in the evaluation of the rate of change in volume was applied to the peripheral surface of the piston rod 13.

The evaluation of the force of friction was performed by measuring a load [N] in the axial direction of the piston rod 13 when the piston rod 13 was slid in an A direction and a B direction illustrated in FIG. 5 at a speed of 1.0 mm/sec.

Figure 6A:
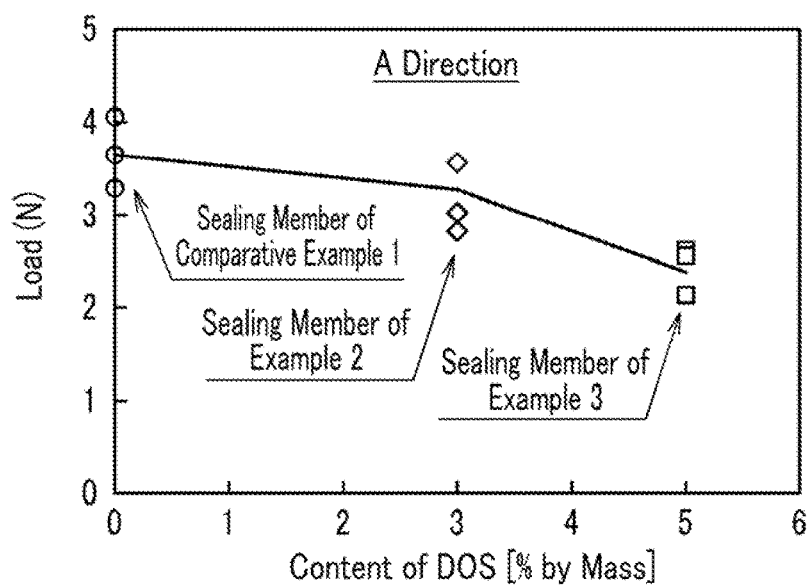
FIGS. 6A and 6B are graphs showing relationships between a content [% by mass] and a force of friction (load [N]) of dioctyl sebacate (DOS) contained in the sealing member.
Figure 6B:
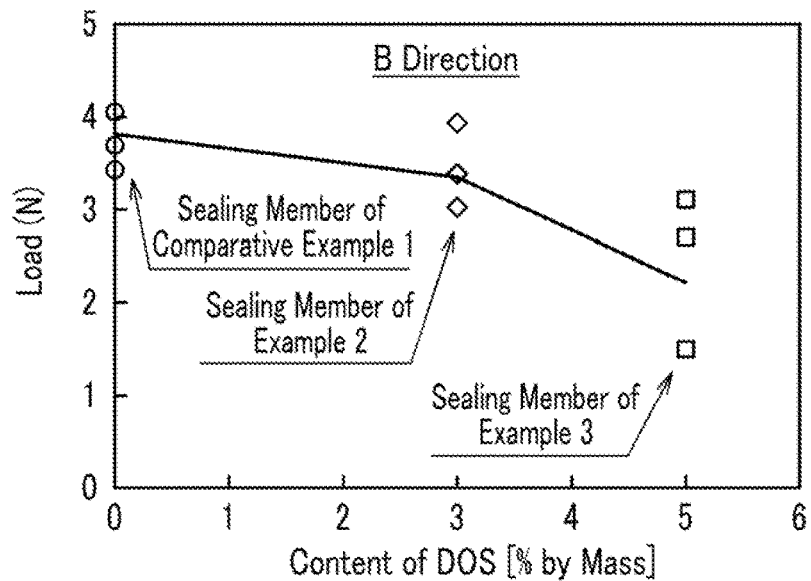

FIGS. 6A and 6B are graphs showing a relationship between the content [% by mass] and the force of friction (load [N]) of dioctyl sebacate (DOS) contained in the sealing member. FIG. 6A is a graph showing a load while the piston rod 13 was slid in the A direction, and FIG. 6B is a graph showing a load while the piston rod 13 was slid in the B direction.

As illustrated in FIGS. 6A and 6B, it was confirmed that the force of friction of the sealing member was reduced as the content of dioctyl sebacate (DOS) in the sealing member was increased.

Additionally, it was confirmed that the force of friction was rapidly reduced once the content of dioctyl sebacate (DOS) reached 3% by mass.

REFERENCE SIGNS LIST 10 vibration damping device
12 cylinder
12a eyepiece
13 piston rod
14 first liquid chamber
15 second liquid chamber
16 piston
17 high pressure gas chamber
18 free piston
19 rod guide
19a general inner diameter portion
19b step portion
21 communication hole
26 sealing member
26a small diameter portion
26b large diameter portion
26c lip portion
30 oil
31 ester-based additive
32 para-phenylene diisocyanate-based polyurethane
M boundary film

The invention claimed is:
1. A vibration damping device comprising:
a cylinder;
a piston being slidably arranged in the cylinder and separating an inside of the cylinder into a first liquid chamber and a second liquid chamber;
a piston rod extending through an end portion opening of the cylinder and the first liquid chamber from the piston;
a rod guide through which the piston rod is inserted, the rod guide being arranged at the end portion opening, of the first liquid chamber of the cylinder, of the cylinder;
oil filled in the first liquid chamber; and
a sealing member configured to slide with respect to the piston rod and arranged between the rod guide and the piston rod;
wherein the oil comprises a dioctyl sebacate; and
wherein the sealing member comprises:
95.0% by mass or more and 99.5% by mass or less of a para-phenylene diisocyanate-based polyurethane; and
0.5% by mass or more and 5% by mass or less of the dioctyl sebacate.
2. The vibration damping device according to claim 1, wherein
the para-phenylene diisocyanate-based polyurethane has a thermosetting property.

* * * * *